United States Patent [19]

Lech, Jr.

[11] 4,303,149
[45] Dec. 1, 1981

[54] CLUTCH DRIVEN PLATE WITH SPLINE LOCKING HUB

[75] Inventor: Thaddeus Lech, Jr., Sterling Heights, Mich.

[73] Assignee: Borg-Warner Corporation, Chicago, Ill.

[21] Appl. No.: 136,849

[22] Filed: Apr. 3, 1980

[51] Int. Cl.³ .............................................. F16D 3/06
[52] U.S. Cl. .................................... 192/70.19; 64/23; 403/359
[58] Field of Search ................ 192/70.19, 70.2, 30 R, 192/30 V; 74/409, 440; 64/23; 403/328, 359

[56] References Cited

U.S. PATENT DOCUMENTS

| | | | |
|---|---|---|---|
| 2,220,610 | 11/1940 | Miller | 403/328 X |
| 3,174,356 | 3/1965 | Michalec | 74/440 |
| 3,179,450 | 4/1965 | Recker | 403/359 X |
| 3,359,819 | 12/1967 | Veillette et al. | 74/409 |
| 3,365,973 | 1/1968 | Henden | 74/409 |
| 3,399,549 | 9/1968 | Nagele | 64/23 |
| 3,424,287 | 1/1969 | Dreiding | 192/55 |
| 3,770,087 | 11/1973 | Jaeschke | 192/18 B |
| 3,803,935 | 4/1974 | Nozawa | 74/409 |
| 4,016,962 | 4/1977 | Black | 192/70.2 |
| 4,210,033 | 7/1980 | Erikson et al. | 74/409 X |

FOREIGN PATENT DOCUMENTS

| | | | |
|---|---|---|---|
| 1374221 | 8/1964 | France | 403/359 |
| 258084 | 4/1949 | Switzerland | 64/23 |

Primary Examiner—Rodney H. Bonck
Attorney, Agent, or Firm—James A. Geppert

[57] ABSTRACT

A hub for a clutch driven member utilized in an automotive vehicle clutch assembly wherein the barrel portion of the hub is notched or slotted to receive a segmental barrel portion that is spring loaded to eliminate the backlash space of the splined attachment between the hub and the end of a transmission input shaft.

9 Claims, 10 Drawing Figures

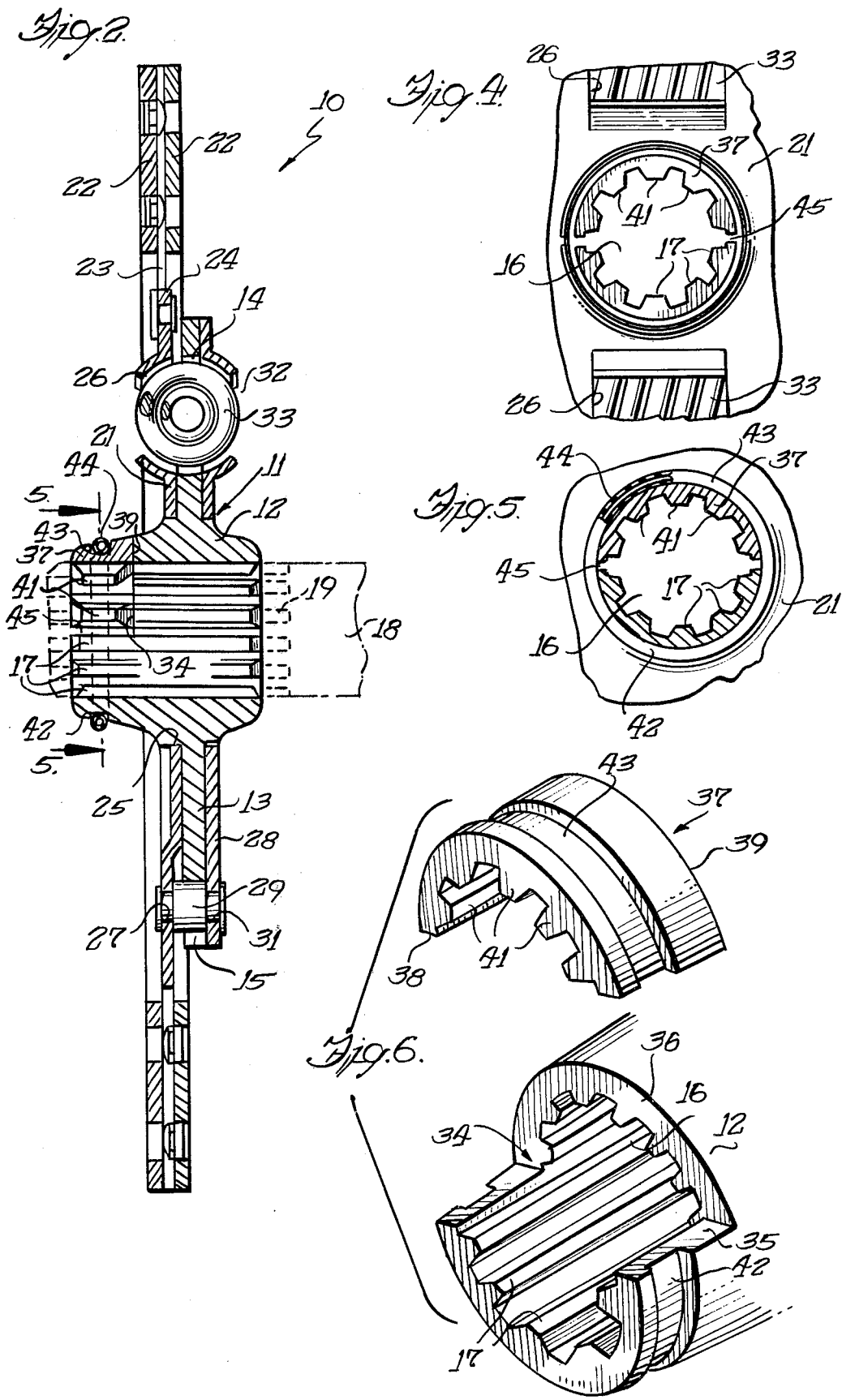

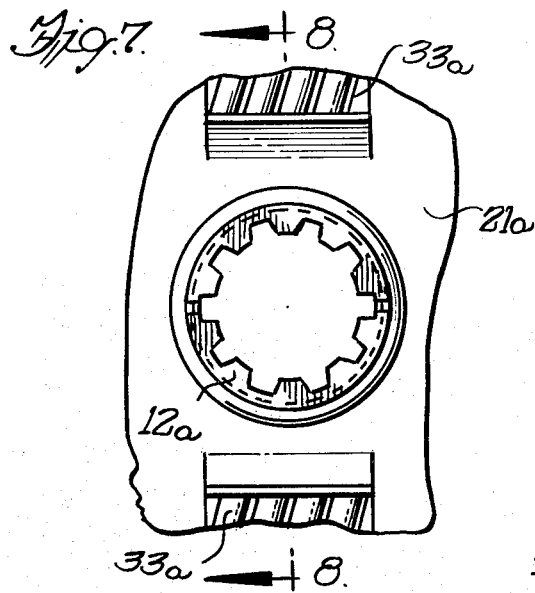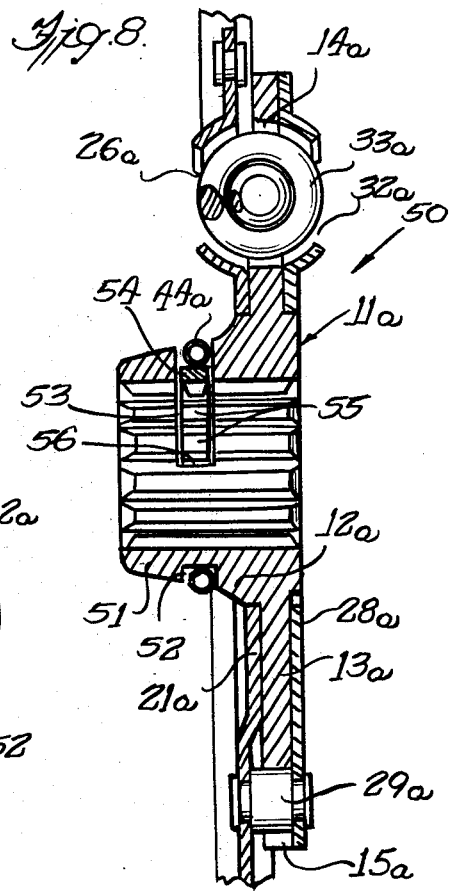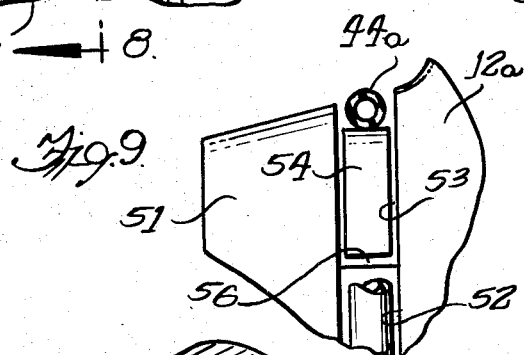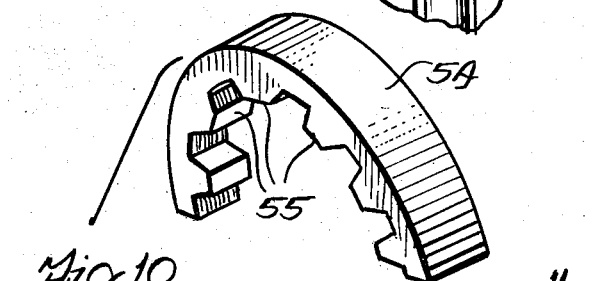

CLUTCH DRIVEN PLATE WITH SPLINE LOCKING HUB

BACKGROUND OF THE INVENTION

The present invention relates to splined connections between torque transmitting members, and more particularly to the connection between a clutch driven plate and a transmission input shaft. In the conventional longitudinally slidable splined connections, such as in a vehicle friction clutch, undesirable radial clearances of varying degrees exist due to manufacturing tolerances and operational wear which eventually result in further wear, noise and high impact loading on the splines when torque is initiated or reversed. This condition is known as "backlash" and may cause premature failure at the splined connection.

It is desirable to reduce or eliminate the backlash space between the splines of a clutch hub and transmission input shaft because the engine power impulses cause the splined attachment to oscillate through its backlash space, which excites the transmission gears to produce rattle at the idle rpm in the neutral transmission position.

Anti-backlash devices have been incorporated in gear transmissions wherein a split gear assembly or scissor spur gears have a spring means interposed between the segments of the transversely sliced spur gear; the spring means being inserted in the assembly with the two split gear halves being angularly offset by the spring means to take up circumferential play with the adjacent mating gear. However, this arrangement is not considered practical for the internally splined hub of a friction clutch plate.

SUMMARY OF THE INVENTION

The present invention comprehends the provision of a novel clutch hub construction to eliminate the backlash which occurs between the splines of the clutch hub and the transmission input shaft leading to an automotive vehicle transmission. The clutch hub is notched at one end to accommodate a splined segment conformably received therein, with the exterior surface of both the hub and the segment provided with an aligned annular groove. A preloaded garter spring is received in the groove to hold the segment in operative position and squeezes the segment and hub together to eliminate the backlash space.

The present invention also contemplates the provision of a novel clutch hub having an alternate construction to eliminate the backlash space. In this embodiment, a slot is formed in the clutch hub to receive a segment which is retained in position by a preloaded garter spring received in a semi-annular groove in the aligned hub and slot for the segment.

Further objects of the present invention are to provide a construction of maximum simplicity, efficiency, economy and ease of assembly and operation, and such further objects, advantages and capabilities as will later more fully appear and are inherently possessed thereby.

DESCRIPTION OF THE DRAWINGS

FIG. 2 is a cross sectional view of the clutch driven plate assembly taken on the irregular line 2—2 of FIG. 1.

FIG. 4 is a partial front elevational view of the hub and segment.

FIG. 5 is a vertical cross sectional view taken on the line 5—5 of FIG. 2.

FIG. 6 is a partial enlarged exploded perspective view of the notched hub and segment.

FIG. 7 is a partial front elevational view of an alternate embodiment of clutch hub in the clutch plate assembly.

FIG. 8 is a cross sectional view taken on the line 8—8 of FIG. 7.

FIG. 9 is an enlarged partial side elevational view of the clutch hub of FIG. 7.

FIG. 10 is an enlarged partial exploded cross sectional view of the hub and ring segment of FIG. 9.

DESCRIPTION OF THE PREFERRED EMBODIMENTS

Figure 1:
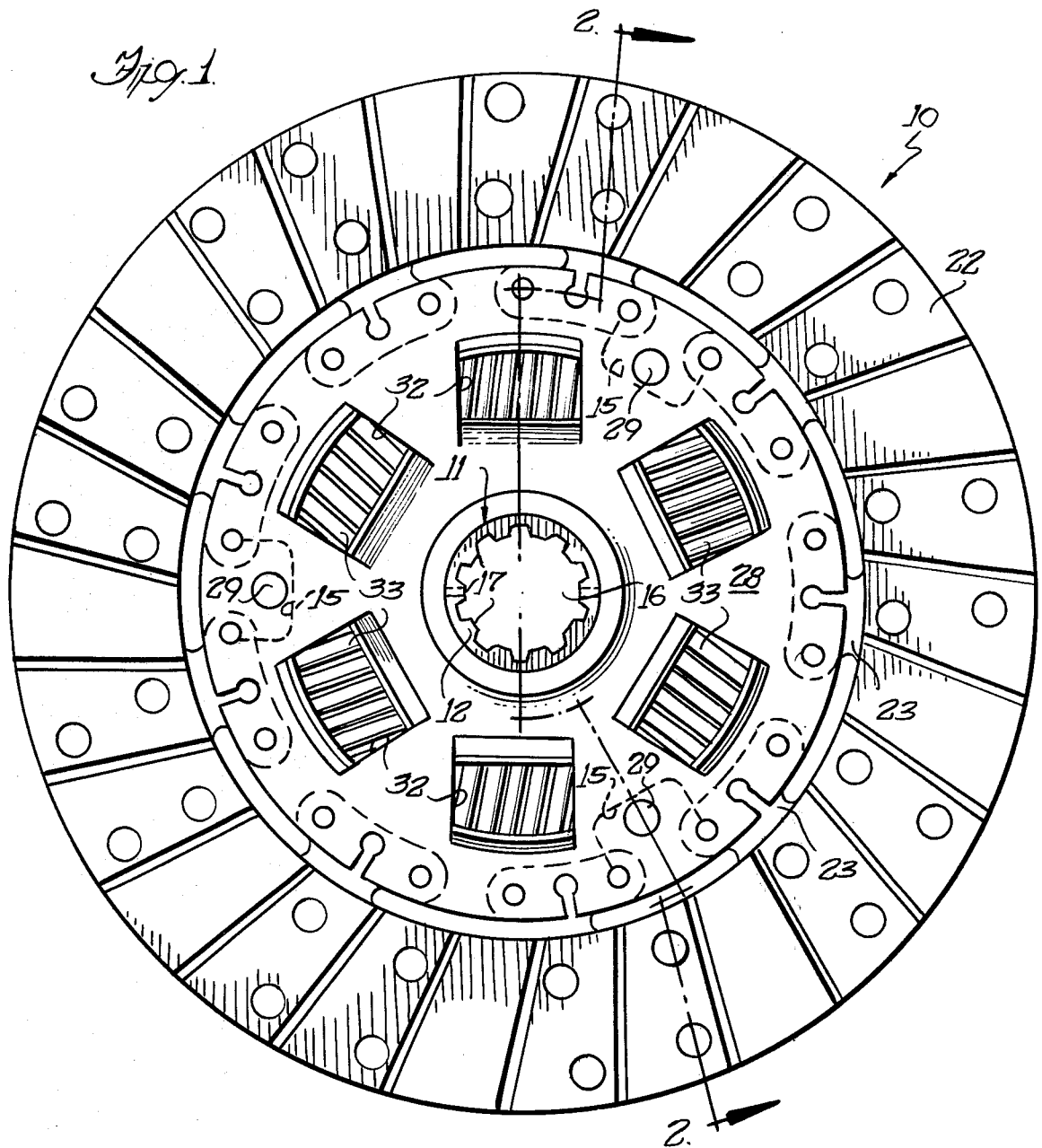
FIG. 1 is a rear elevational view of a clutch driven plate assembly embodying the spline locking hub of the present invention.
Figure 3:
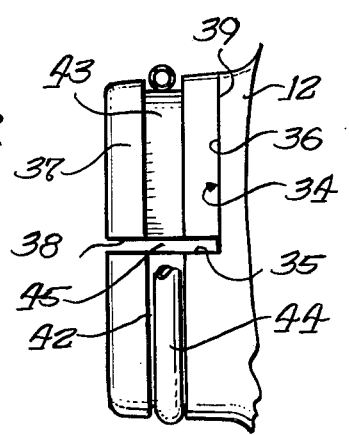
FIG. 3 is a partial side elevational view of the notched end of the hub and semi-circular segment.

Referring more particularly to the disclosure in the drawings wherein are shown illustrative embodiments of the present invention, FIGS. 1-6 disclose a clutch driven plate assembly 10 including a hub 11 having a hub barrel 12 and an integral radial flange 13 having circumferentially spaced windows 14 and peripheral notches 15. The barrel has a central opening or passage 16 with axially extending internal splines 17 to receive the splined end 19 of a transmission input shaft 18 leading to a vehicle transmission (not shown).

A clutch plate 21 has the opposite friction facings 22, 22 mounted on segmental plates 23 which are secured to the plate periphery 24 and a central opening 25 journalled on the hub barrel 12. The clutch plate includes windows 26 and openings 27 adjacent the periphery and is located on one side of the hub flange 13. A spring retainer plate 28 is positioned on the opposite side of the flange and is secured to the clutch plate by spacer rivets 29 secured in openings 31 in the plate 28 and in the axially aligned openings 27 in the clutch plate; the rivets extending through the notches 15. The plate 28 also has windows 32 axially aligned with the windows 14 in the hub flange 13 and windows 26 in the clutch plate 21 to receive damper springs 33 to provide vibration damping for the clutch driven plate assembly.

The forward end of the hub barrel 12 has a semicircular notch 34 formed therein and defined by a substantially diametrically extending surface 35 and a substantially vertical surface 36 generally parallel to the plane of the hub flange 13. Received in this notch 34 is a generally semi-circular barrel segment 37 having corresponding surfaces 38 and 39 and internally splined at 41. The barrel has an external annular groove 42 that is interrupted by the notch 34, but is aligned with an external semi-annular groove 43 on the surface of the segment 37 to receive a preloaded garter spring 44.

The clutch driven plate assembly 10 is located in a conventional clutch assembly with the friction facings 22, 22 being positioned between a flywheel driven by the vehicle engine and a pressure plate actuated by a diaphragm spring or other clutch actuating means. The clutch driven plate assembly 10 operates in a conventional manner, except for the garter spring 44 which squeezes the hub barrel 12 and segment 37 together to close the gap 45 and eliminate the backlash space at the transmission input shaft spline tooth at gap 45. The spring 44 supplies sufficient force to keep the backlash space from reappearing at gap 45 during engine impulses at idle rpm in the neutral transmission position.

FIGS. 7 through 10 disclose an alternate embodiment of clutch driven plate assembly 50 wherein parts identical to those shown in FIGS. 1-6 have the same reference numeral with a script a. The assembly 50 includes a hub 11a having a barrel 12a and a radial flange 13a, a clutch plate 21a journalled on the hub barrel 12a and carrying friction facings, and a spring retainer plate 28a on the opposite side of the hub flange and secured to the clutch plate 21a by spacer rivets 29a extending through peripheral notches 15a on the flange. Damper springs 33a are received in the axially aligned windows 26a, 14a and 32a of the clutch plate 21a, hub flange 13a and spring retainer plate 28a, respectively.

Spaced inwardly of the forward end 51 of the hub barrel 12a is an annular groove 52 interrupted by a semi-circular slot 53 of substantially the same width as the groove. A slightly smaller semi-circular ring sement 54 having internal spline segments 55 is conformably received in the slot and a preloaded garter spring 44a is received in the groove 52 and slot 53 to engage the ring sement 54 and act to close the gap 56 as disclosed for the previous embodiment to eliminate backlash at idle rpm with the transmission in neutral position.

I claim:

1. In a clutch driven plate assembly including a hub having a barrel with an internally splined passage extending therethrough to receive the externally splined end of a shaft to be driven thereby, and a clutch plate operatively connected to said hub and carrying oppositely disposed friction facings adapted to be engaged by a flywheel and pressure plate on the opposite sides thereof, the internal hub splines and external shaft splines having backlash space therebetween, the improvement comprising a semi-circular segment adapted to engage the splined end of said shaft, said hub barrel having a semi-circular recess opening into the internally splined passage conformably receiving said segment, and resilient means squeezing said segment against said shaft to eliminate said backlash space.

2. A clutch driven plate assembly as set forth in claim 1, wherein said recess is a semi-circular notch formed at one end of said hub barrel.

3. A clutch driven plate assembly as set forth in claim 2, wherein said hub barrel has an external annular groove therein interrupted by said notch, said semi-circular segment has an external groove circumferentially aligned with said hub groove, and said resilient means comprises a preloaded garter spring received in said aligned grooves.

4. A clutch driven plate assembly as set forth in claim 3, wherein said segment has an internal surface with axial splines generally aligned with the splines in said hub barrel passage.

5. A clutch driven plate assembly as set forth in claim 1, in which said recess is a semi-circular slot spaced from an end of said barrel, and said segment is a semi-circular ring conformably received in said slot.

6. A clutch driven plate assembly as set forth in claim 5, wherein said hub barrel has an annular groove formed in the exterior surface thereof interrupted by said slot, said slot being of substantially the same width as the groove.

7. A clutch driven plate assembly as set forth in claim 6, in which said resilient means is a preloaded garter spring received in said groove and slot to contact the exterior surface of said semi-circular ring and urge it against the barrel.

8. A clutch driven plate assembly as set forth in claim 7, wherein said semi-circular ring has an internal surface provided with axial splines generally aligned with the splines in the hub barrel passage.

9. A clutch driven plate assembly as set forth in claim 8, in which said garter spring acts to squeeze the ring and hub together to eliminate the backlash space associated with the shaft to be driven.

* * * * *